United States Patent
Ruebush et al.

(10) Patent No.: US 10,839,455 B2
(45) Date of Patent: *Nov. 17, 2020

(54) SYSTEMS AND METHODS FOR MANAGING A LOAN APPLICATION

(71) Applicant: CAPITAL ONE SERVICES, LLC, McLean, VA (US)

(72) Inventors: Mitchell H. Ruebush, Wilmington, DE (US); Stephen Payne, Berwyn, PA (US)

(73) Assignee: Capital One Services, LLC, McLean, VA (US)

( * ) Notice: Subject to any disclaimer, the term of this patent is extended or adjusted under 35 U.S.C. 154(b) by 82 days.

This patent is subject to a terminal disclaimer.

(21) Appl. No.: 16/279,000

(22) Filed: Feb. 19, 2019

(65) Prior Publication Data

US 2019/0180365 A1  Jun. 13, 2019

Related U.S. Application Data

(63) Continuation of application No. 15/810,366, filed on Nov. 13, 2017, now Pat. No. 10,262,363, which is a (Continued)

(51) Int. Cl.
  *G06Q 40/02* (2012.01)
(52) U.S. Cl.
  CPC .................... *G06Q 40/025* (2013.01)
(58) Field of Classification Search
  CPC .................... G06Q 40/025; G06F 16/958
  See application file for complete search history.

(56) References Cited

U.S. PATENT DOCUMENTS

2004/0002915 A1* 1/2004 McDonald ............ G06Q 50/18
                                                                705/38
2004/0205452 A1  10/2004 Fitzsimons et al.
(Continued)

FOREIGN PATENT DOCUMENTS

EP          609996 A2 *  1/1994  ............. G06F 17/30

OTHER PUBLICATIONS

Asim M. El Tahir Ali et al. Overview and Comparison of Plagiarism Detection Tools. Department of Computer Science, VSB-Technical University of Ostrava, Poruba, Czech Republic. (Year: 2011).*
(Continued)

*Primary Examiner* — Virpi H Kanervo
(74) *Attorney, Agent, or Firm* — Pillsbury Winthrop Shaw Pittman LLP

(57) ABSTRACT

The disclosed embodiments provide systems and methods for managing a loan application. In one embodiment, a method is disclosed that may include identifying one or more unfulfilled conditions associated with a loan application of a customer and sending, to a customer device, a request for a loan application document based on the identified one or more unfulfilled conditions. The method may also include receiving, from the customer device, a responsive loan application document. The method may also include identifying a document type for the responsive loan application document and confirming that the responsive loan application document is a valid document. Finally, the method may also include sending loan application status information to the customer device based on the confirmation.

20 Claims, 7 Drawing Sheets

Related U.S. Application Data continuation of application No. 14/144,995, filed on Dec. 31, 2013, now Pat. No. 10,269,063.

(60) Provisional application No. 61/751,577, filed on Jan. 11, 2013.

(56) References Cited

U.S. PATENT DOCUMENTS

| | | |
|---|---|---|
| 2006/0150090 A1 | 7/2006 | Swamidass |
| 2007/0177195 A1 | 8/2007 | Rebert et al. |
| 2008/0273221 A1 | 11/2008 | Couchman et al. |
| 2011/0169735 A1 | 7/2011 | Weber |
| 2011/0182500 A1 | 7/2011 | Esposito et al. |
| 2012/0143658 A1 | 6/2012 | Toscano |
| 2014/0372873 A1 | 12/2014 | Leung et al. |

OTHER PUBLICATIONS

T.S. Parikh, "Using Mobile Phones for Secure, Distributed Document Processing in the Developing World," IEEE Pervasive Computing, vol. 4, Issue 2, pp. 74-81 (Jan.-Mar. 2005).

Perry et al., "Digital Watermarks as a Security Feature for Identity Documents," Proc. SPIE 3973, Optical Security and Counterfeit Deterrence Techniques III (Apr. 7, 2000).

Parikh et al., "Mobile Phones and Paper Documents: Evaluating a New Approach for Capturing Microfinance Data in Rural India," Proceedings of the SIGCHI Conference on Human Factors in Computing Systems, pp. 551-560 (Apr. 22-27, 2006).

\* cited by examiner

SYSTEMS AND METHODS FOR MANAGING A LOAN APPLICATION

PRIORITY CLAIM

This application is a continuation of U.S. patent application Ser. No. 15/810,366, filed Nov. 13, 2017, which claims priority to U.S. patent application Ser. No. 14/144,995, filed Dec. 31, 2013, which claims priority to U.S. Provisional Patent Application No. 61/751,577, filed on Jan. 11, 2013, the disclosures of each application being incorporated herein by reference in their entirety.

FIELD

The disclosed embodiments generally relate to financial service systems, and more particularly, to systems, processes, and computer programs for facilitating the management of loan applications.

BACKGROUND

Financial service providers offer a wide range of financial services and products. Examples of financial service providers include loan originators, banks, credit unions, savings and loans, thrifts, real estate brokers and/or agents, home builders, financial planners, or any other entity capable of managing a loan application.

Unfortunately, existing financial services systems offer limited functionality for the management of the loan applications. Loan application processing is typically inefficient and time-consuming, requiring a lot of paperwork be processed manually. Loan applicants are limited in their ability to provide responsive loan application documents electronically. Further, where such applications are submitted electronically, the processing is typically handled in a manner that requires re-interpretation of new documentation received in order to match it to the pertinent customer account and loan application details. The loan approval process also relies substantially on extraction of user document submissions from emails and manually linking those documents to specific unique identifiers to facilitate review and approval of the loan applications. Additionally, existing systems typically offer limited functionality with regards to confirming the validity of loan application documents submitted by users.

SUMMARY

Consistent with disclosed embodiments, systems and methods are provided for managing a financial loan application. For example, the disclosed embodiments may allow a financial service provider, or other type of entity, to reduce the time and paperwork required to approve a loan application. In some embodiments, the loan application may include a mortgage application. The financial service provider, through, for example, financial service provider computer components, may request and receive one or more documents associated with the loan application provided by a customer, such as, for example, through a mobile device. For example, in one aspect, the customer may receive the document request and take a picture of the requested document using the mobile device. The customer may upload the document instantly to a web based infrastructure associated with the financial service provider. The financial service provider may identify the type of document (e.g. w-2 form, pay stub, etc.) and assign a unique identifier to the document. The unique identifier may associate the document to a loan application customer account. In certain embodiments, the financial service provider may use the unique identifier to allow the document to be immediately reviewed for approval. The financial service provider or another entity may review the uploaded document and approve the loan application.

In another embodiment, a method is disclosed that may include sending a request for a loan application document to a customer device, the request including a prompt for a customer associated with the customer device to upload the loan application document to a server. The method may also include receiving from the customer device a responsive loan application document, the responsive loan application document including an electronic version of the requested loan application document. In another embodiment, the method may include assigning a unique identifier to the responsive loan application document, the unique identifier associating the responsive loan application document with a customer account provided by the financial service provider. The method may further include identifying a document type for the responsive loan application document and confirming that the responsive loan application document is a valid document corresponding to the requested loan application document based on the identified document type. In other aspects, the method may include sending loan application status information to the customer device for display by the customer device, the loan application status information including a confirmation notification that the responsive loan application document was accepted for processing a loan application associated with the customer It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
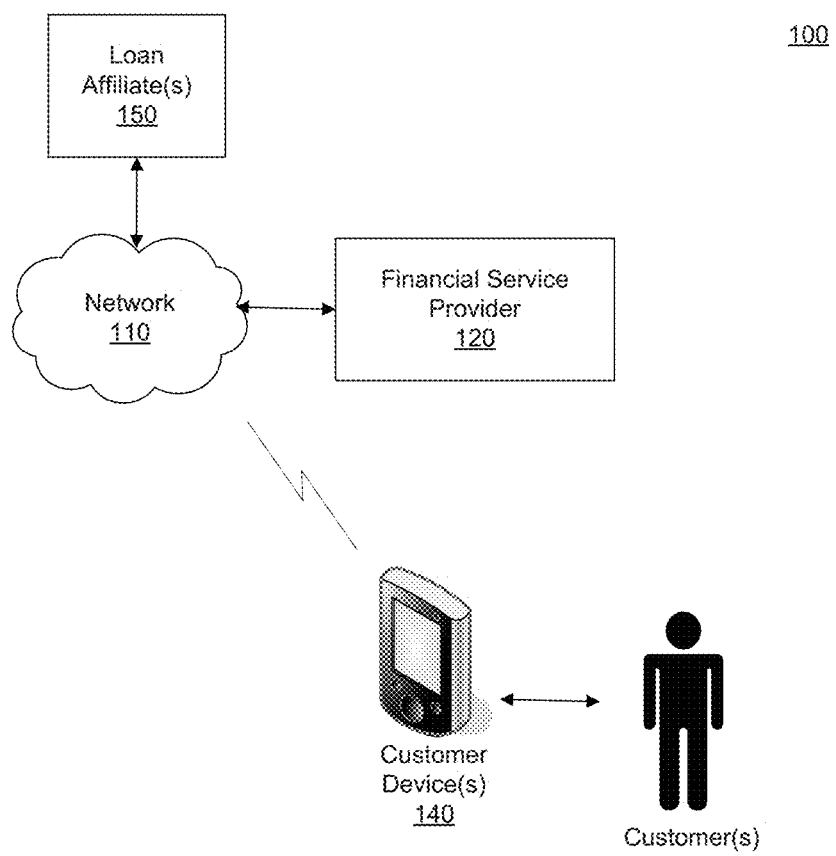
FIG. 1 illustrates an exemplary system for providing loan application processes consistent with disclosed embodiments.

FIG. 1 is a diagram illustrating an exemplary system 100 for managing a loan application. The components and arrangement of the components of system 100 may vary. For example, while some components of system 100 are represented as a single component, in some embodiments, one or more of those components may include multiple components, may be combined with other components, may be omitted, or duplicated. Furthermore, system 100 may additionally include other entities and/or sources of information that is associated with financial services, such as for example loan applications. In one embodiment, system 100 may include a network 110, financial service provider 120, customer(s) 130, customer device(s) 140, and loan affiliate(s) 150.

Network 110 may be any type of network configured to provide communications between components of FIG. 1. For example, network 100 may be any type of network (including infrastructure) that provides communications, exchanges information, and/or facilitates the exchange of information, such as the Internet, a Local Area Network, or other suitable connection(s) that enables system 100 to send and receive information between the components of system 100.

Financial service provider 120 may be an entity that provides one or more financial services and/or financial service products for one or more customers. In one aspect, financial service provider 120 may comprise a loan originator and may provide and manage the origination of loan applications. In certain embodiments, financial service provider 120 may include a bank, credit union, savings and loans, thrifts, real estate broker and/or agent, home builders, financial planners, and/or any entity capable of managing a loan application. A loan may include, for example, a real estate loan, such as a mortgage loan. The disclosed embodiments may be implemented with other types of loans or financial services or financial service products. In certain aspects, financial service provider 120 may associate each loan with a customer's financial service account managed by financial service provider 120. In one embodiment, financial service accounts may further include, for example, loan accounts, loan application accounts, etc. In one example, financial service provider 120 may include a server that is configured to execute software instructions stored in one or more memory devices to perform one or more operations consistent with the disclosed embodiments.

Customer(s) 130 may include one or more customers associated with financial service accounts of financial service provider 120. Therefore, customer 130 may include a prospective borrower for a loan including a mortgage loan. Customer 130 may communicate with other components of system 100 using one or more customer device(s) 140, including any suitable computer device and/or telephonic device. In some embodiments, customer device 140 may be one or more electronic devices, such as a laptop or desktop computer, mobile device (e.g., smartphone), tablet, and the like. In one aspect, customer device 140 may be capable of receiving information through network 110, using known information delivery mechanisms, such as email, text, app alerts etc.

Loan affiliate(s) 150 may include one or more entities involved in loan transactions. For example, loan affiliate 150 may include a real estate office, title company, underwriter, escrow company, home inspector, credit reporting agency, etc. In some embodiments, loan affiliate 150 may include a separate entity that does business with financial service provider 120. In other aspects, financial service provider 120 and loan affiliate 150 may be the same entity. Loan affiliate 150 may include one or more processors, memory devices, and other computing components that are configured to perform one or ore processes consistent with the disclosed embodiments.

Figure 2:
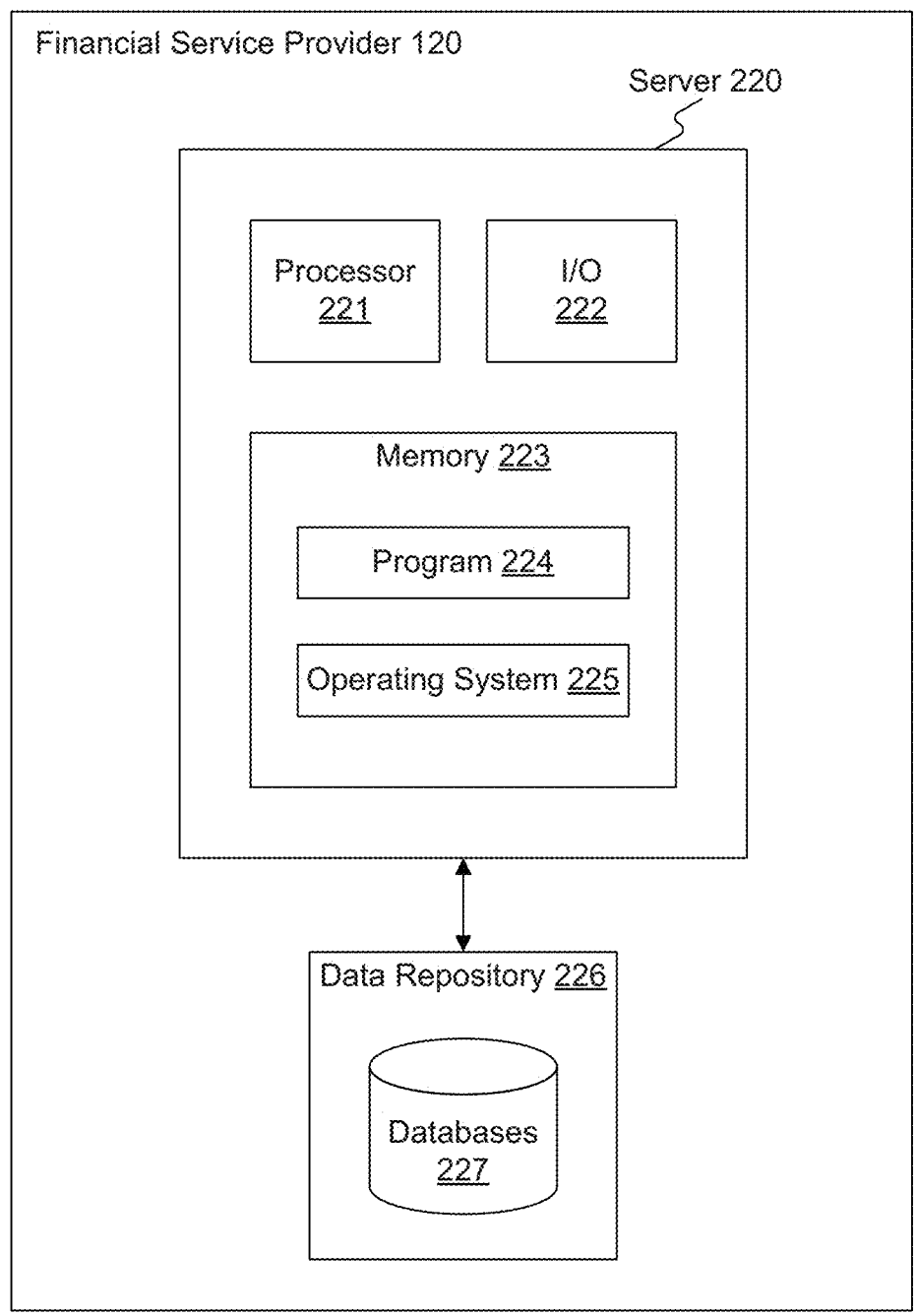
FIG. 2 illustrates another exemplary system for providing loan application processes consistent with disclosed embodiments.

FIG. 2 shows an exemplary system that may be associated with a financial service provider and included in financial service provider 120. In one embodiment, the system includes a server 220 having one or more processors 221, one or more memories 223, and one or more input/output (I/O) devices 222. Alternatively, server 220 may take the form of a general purpose computer, a mainframe computer, or any combination of these components. Server 220 may be standalone, or it may be part of a subsystem, which may be part of a larger system.

Processor 221 may include one or more known processing devices, such as a microprocessor from the Pentium™ or Xeon™ family manufactured by Intel™, the Turion™ family manufactured by AMD™, or any of various processors manufactured by Sun Microsystems.

Memory 223 may include one or more storage devices configured to store instructions used by processor 221 to perform functions related to disclosed embodiments. For example, memory 223 may be configured with program 224 that performs several functions when executed by processor 221. Therefore, the disclosed embodiments are not limited to separate programs or computers configured to perform dedicated tasks. For example, memory 223 may include a single program 224 that performs the functions of the server 120, or program 224 could comprise multiple programs. Additionally, processor 221 may execute one or more programs located remotely from server 220. For example, financial service provider system 120 may access one or more remote programs that, when executed, perform functions related to disclosed embodiments.

Memory 223 may also be configured with operating system 225 that performs several functions well known in the art when executed by server 220. By way of example, the operating system may be Microsoft Windows™, Unix™, Linux™, Solaris™, or some other operating system. The choice of operating system, and even the use of an operating system, is not critical to any disclosed embodiment.

I/O devices 222 may be one or more devices that are configured to allow data to be received and/or transmitted by server 220. I/O devices 222 may include one or more digital and/or analog communication devices that allow server 220 to communicate with other machines and devices, such as customer devices 140.

Server 220 may also be communicatively connected to one or more data repositories 226, as shown in FIG. 2. Server 220 may be communicatively connected to data repositories 226 through network 110. Data repository 226 may include one or more files or databases 227 that store information and are accessed and/or managed through server 220. By way of example, databases 227 may be Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, financial service provider 120 may include data repository 226. Alternatively, data repository 226 may be located remotely from financial service provider 120.

Figure 3:
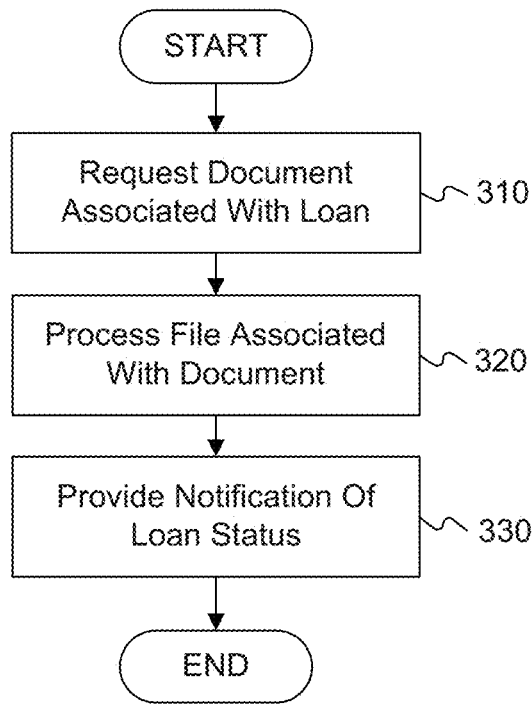
FIG. 3 depicts a flowchart of an exemplary loan application process consistent with disclosed embodiments.

FIG. 3 is a flow diagram 300 of an exemplary loan application process, consistent with disclosed embodiments.

For example, in step 310, financial service provider 120 may request a document associated with the loan application. In one aspect, server 220 may execute software processes that analyze one or more conditions required to process a loan application (e.g. one or more documents and information needed for loan approval). In one embodiment, server 220 may identify one or more conditions for processing a loan application, such as a document (e.g., copy of driver's license, etc.). Based on the analysis, server 220 may generate and send a request for the one or more documents needed to fulfill the one or more conditions. Server 220 may send a request, including a prompt, for the customer 130 to upload the document. The customer 130, via for example, customer device 140, may send the requested document to financial service provider 120. In one embodiment, server 220 may receive the customer's response with the document (step 320). Server 220 may be configured to execute software processes that process the received document to determine whether to approve a loan application associated with the customer 130. Server 220 may generate a notification regarding the status of the loan application and send the notification to customer 130, via, for example, customer device 140 (step 330).

Figure 4:
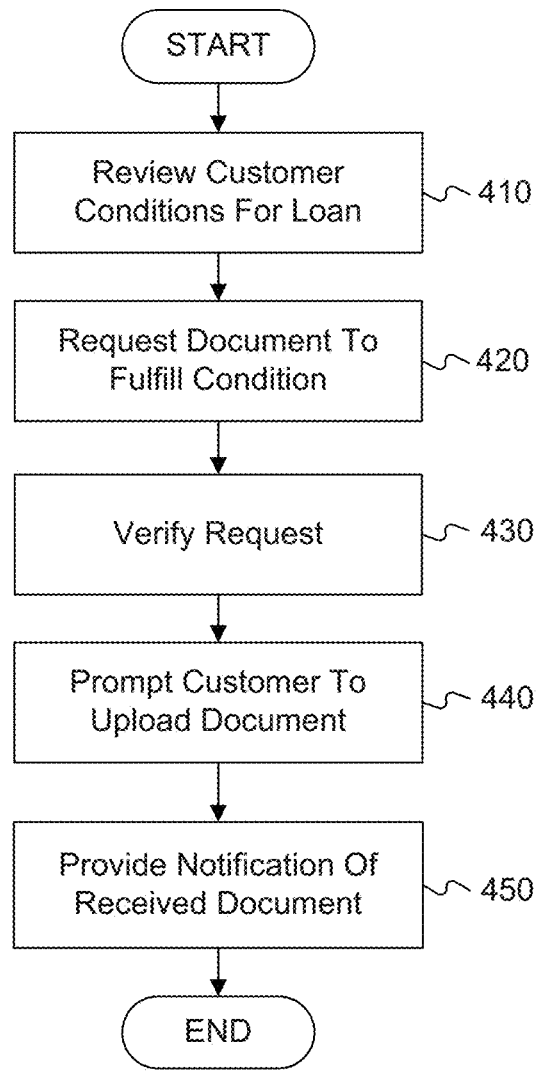
FIG. 4 depicts a flowchart of an exemplary loan document request process consistent with disclosed embodiments.

FIG. 4 depicts a flowchart of an exemplary document request process consistent with disclosed embodiments. In some embodiments, server 220 may review customer one or more conditions for a loan from financial service provider 120 (step 410). The conditions may be stored as information in a memory that identify one or more items of information, for example, that may be required for loan approval. In one aspect, a condition may indicate that one or ore documents and/or information are required for loan approval. For example, documents may include w-2 forms, pay stubs, bank statements, appraisal documents, home inspection documents, signed contract, disclosure forms, copies of driver's licenses, etc. A document may be associated with loan affiliate 150. In some embodiments, loan affiliate 150 may request a document from server 220 and/or customer 130, while in other embodiments loan affiliate 150 may produce the document and send the document to server 220.

Server 220 may store the documents in a memory that is accessible by one or more loan processing software processes executed by server 220 or another component of financial service provider 120. For example, financial service provider 120 may perform processes that generate a web-enabled user interface that may allow communications between customer 130 and financial service provider 120. The web-enabled interface may include a website, web portal, mobile device application (mobile application), etc. Server 220 may arrange and organize documents received by server 220 and associated with one or more loan conditions, such that they may be presented in the web-enabled user interface.

Server 220, loan affiliate 150, and/or another entity may request a document associated with a condition associated with customer 130. In one example, once server 220 has identified a condition that is needed to fulfill a loan application, server 220 may generate a request for the document associated with the condition (step 420). For example, server 220 may generate a request for a w-2 or pay stub associated with customer 130. Server 220 may request the document by creating an alert message and sending the alert message to customer device 140. The alert message may include, for example, a text alert, email, mobile application alert, or any other message that may notify customer 130 of the unfulfilled condition. In one embodiment, server 220 may generate and send an alert message that is configured to be received and processed by a mobile application executing on customer device 140, which may be a mobile device. For example, the alert message may include text (or graphics, etc.) identifying the customer and the document that is being requested (e.g., "Hi {customer name}, You Need to Upload Your W-2 Form"). In another embodiment, server 220 may generate and send an alert message that is configured to be received and processed by a web server executing on customer device 140, which may be a computer. For example, the alert message may include a notification on a website associated with financial service provider 120 identifying the customer and the document being requested.

In another aspect, server 220 may prompt customer 130 to upload one or more documents associated with one or more unfulfilled conditions and customer 130 may select which document to upload. The alert message may include a list of the requested documents that customer 130 may select via an interface displayed by customer device 140. Additionally or alternatively, server 220 may send program code that initiates the activation of a digital camera process and mechanisms implemented by customer device 140.

Server 220 may generate and send a verification message, for example a message that is configured to be received and processed by a mobile application executing on customer device 140. In some embodiments, the verification message may include a notification on a website and/or an email. The verification message may include a confirmation request asking customer 130 to verify that customer 130 aims to upload a particular document (e.g., a w-2 form). For example, the verification message may include text (or graphics, etc.) (e.g. "You Have Selected To Upload a W-2 Form, Would You Like to Proceed?") In other embodiments, customer device 140 may include a mobile application that is configured to execute processes for generating verification messages (e.g., alert messages) consistent with the disclosed embodiments.

Server 220 may be configured to generate a request for customer 130 to upload the requested document. For example, server 220 may prompt customer 130 to upload the document (step 440). In one embodiment, server 220 may generate and send a mobile application alert stating "Please Upload W-2 Form Now". The message may be configured to be received and processed by a mobile application and/or web server executing on customer device 140.

In certain embodiments, customer device 140 may receive or collect the requested document. In one example, in response to the prompt from server 220, customer 130 may record a digital image of the requested document using a digital camera included in customer device 140. Customer device 140 may be configured to execute known digital camera processes to record and store images, such as the image of the document. In one aspect, server 220 may send a prompt message to customer device 140 that includes options for customer 130 to select that initiates a digital camera function (e.g., take a picture of your W-2 form, etc.). Upon selection, customer device 140 may execute a software process(es) that initiates the digital camera functionality of customer device 140 to enable customer 130 to take a photograph of the requested document. Once taken, the software executing on customer device 140 may automatically provide the image of the document in a response message and send the response message to server 220.

In other aspects, customer 130 may initiate the digital camera functionalities of customer device 140 and record the image of the document. Server 220 (or a mobile application executing on customer device 140) may provide an interface with an option to link a recorded image on customer device 140 to a response message that is sent to server 220 in response to the prompt for uploading the document.

Server 220 may receive the response message including the document image from customer device 140. In response, server 220 may perform software processes that analyze the received document and generate a notification message. Server 220 may provide the notification to customer device 140 that server 220 has received the document (step 450). In one embodiment, server 220 may generate and send a mobile application alert indicating that the document was received. In another embodiment, server 220 may generate and send a website notification indicating that the document was received.

In certain embodiments, the response message sent by customer device 140 may include the uploaded document as a file. Certain embodiments include server 220 performing processes that process the file associated with a received document (e.g., step 320 of FIG. 3).

Figure 5:
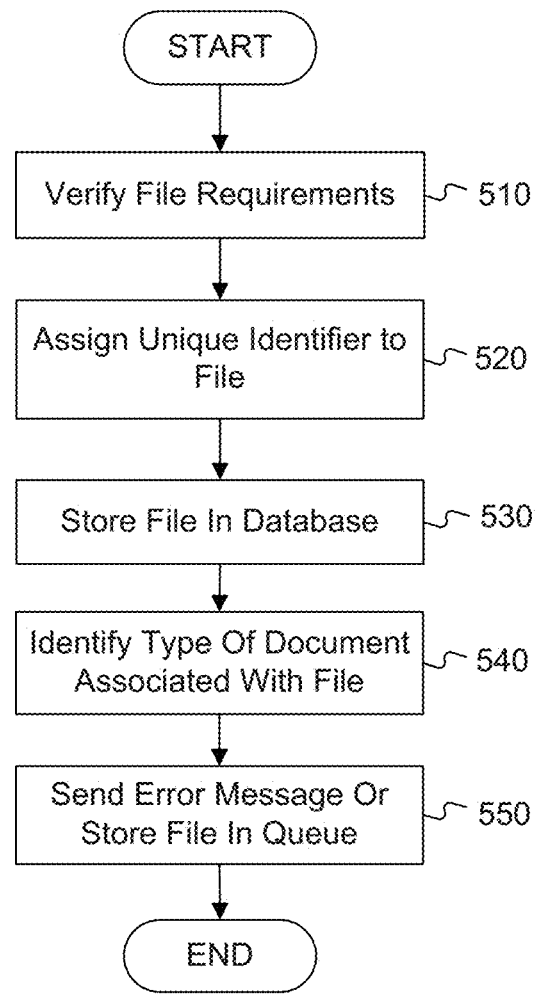
FIG. 5 depicts a flowchart of an exemplary loan document processing process consistent with disclosed embodiments.

FIG. 5 shows a flowchart of an exemplary document processing process consistent with disclosed embodiments. As shown in FIG. 5, server 220 may process the file associated with the document. In one aspect, server 220 may verify one or more file requirements associated with the document to determine whether they meet one or more criteria. As a non-limiting example, server 220 may ensure that the file meets size, source, and virus requirements before it is uploaded to financial service provider 120. For instance, as shown in step 510, server 220 may verify that file characteristics of a received document meet certain threshold requirements. The file characteristics may include the size of the file, the source of the file (e.g., IP address, phone number, or other identifier associated with customer 130 and/or customer device 140). Server 220 may analyze the file characteristics to determine whether server 220 will accept the file for processing (e.g., does the file exceed size limits, is the source of the file a safe source or one that has been flagged as potentially unauthorized, etc.). In some embodiments, server 220 may determine if the file is under a predetermined size (e.g. 2 MB) and that the file has a valid extension (e.g., .png, .jpeg, .gif). Furthermore, server 220 may verify the file requirements to determine whether the file contains a virus. For example, server 220 may run a virus scan on the received file. Additionally or alternatively, server 220 may verify the number of files uploaded by customer device 140. If this number exceeds a predetermined threshold (e.g. 10 files per day), server 220 may not processes the files.

If server 220 determines that any threshold requirement is not met (e.g. file exceeds size limit, file not from a safe source, file includes a virus, etc.), server 220 may generate and send an error message to customer 130 through customer device 140. For example, server 220 may send a mobile application alert indicating an error associated with the uploaded document (e.g., a message including "Error, Unable to Upload Document, Please Try Another Document"). If the threshold requirements are met (e.g., no error condition is found), server 220, in one embodiment, may send a notification to customer device 140 indicating that the document was uploaded successfully (e.g., was accepted). For example, server 220 may generate and send a mobile application alert "Upload Successful".

In one embodiment, server 220 may assign a unique identifier to the file associated with the loan document (step 520). The unique identifier may include, for example, one or more numbers, letter, characters, and/or a combination of these elements, although other types of information may be used as the unique identifier. In another embodiment, server 220 may associate the unique identifier with a customer account associated with financial service provider 120 (e.g. loan application customer account). Additionally, server 220 may associate the unique identifier with the type of document requested (e.g. w-2 form). In one aspect, server 220 may only assign a unique identifier to the file if the file met all file requirements.

As shown in step 530, server 220 may store the file in a database, for instance database 227. The database may include temporary and/or searchable databases (e.g., Teradata or the like). Server 220 may execute software that may request and/or locate the file from database 227 using the unique identifier.

Server 220 may execute software that identifies the type of document associated with the file (step 540). In some embodiments, server 220 may execute software that searches the content of the document for markers and compares the markers with predetermined markers associated with a specific document type. Markers may include, for example, specific keywords, location of words in the document, font of words, icons, characters, etc. For example, server 220 may search the uploaded document for a social security number (or text that is formatted in the known social security number format (e.g., xxx-xx-xxxx), the text "Medicare wages and tips", the text "W-2" in the bottom left corner, etc. to identify this document as a w-2 form. In certain aspects, server 220 may require that certain markers be recognized or that a certain number of markers be recognized. For example, if the markers recognized by server 220 do not meet a predetermined threshold, server 220 may generate and send an error message to customer 130 via customer device 140. In one embodiment, server 220 may send a mobile application alert through customer device 140, such as "Error, Cannot Identify the Document, Please Try Again or Try Another Document", In accordance with certain embodiments, server 220 may associate each document type (e.g. w-2 form, pay stub, appraisal form) with a separate predetermined threshold. Therefore, for example, server 220 may require that five markers be recognized to identify a document as a w-2 form, while requiring that only three markers be recognized to identify a pay stub.

Server 220 may additionally send an error message associated with the document or store the file document in a queue (step 550). If server 220 determines that the received document from customer device 140 is a different document type than the document requested by server 220, server 220 may generate and send an error message to customer device 140. For example, if server requested a w-2 form but does not recognize a sufficient number of markers to identify the document as a w-2 form, server 22 may generate and send an error message (e.g. "Error, Document Not Recognizable as a W-2, Please Try Another Document").

If server 220 determines that the received document from customer device 140 is of the same document type as the document requested by server 220, server 220 may store processed file(s) associated with the received document. In one embodiment, server 220 may store the file, associated with the loan document, in a queue with a unique address (step 560). The queue location may depend on the type of document contained in the file. For example, server 220 may include memory that is partitioned (physically or logically or both) based on the document types (e.g., certain address ranges reserved for W-2 type documents, income-related documents, etc.). In certain embodiments, server 220 may be configured to execute processes that request, search, and access the information stored in the queues.

Figure 6:
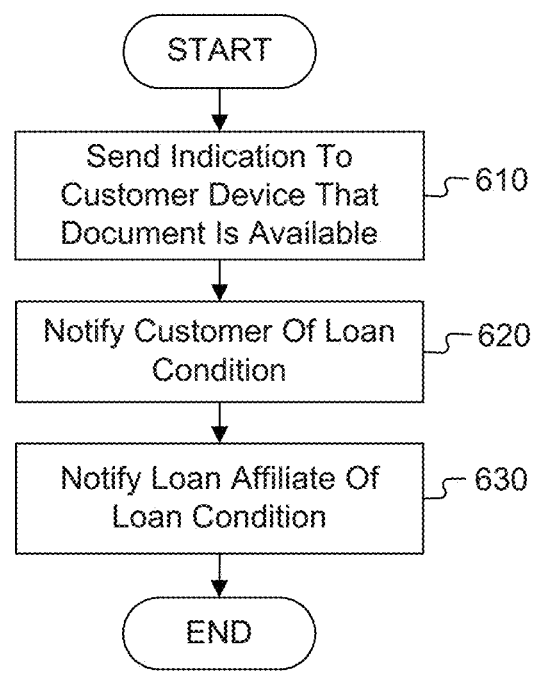
FIG. 6 depicts a flowchart of an exemplary loan status notification process consistent with disclosed embodiments.

FIG. 6 depicts a flowchart of an exemplary loan status notification process consistent with disclosed embodiments. In one embodiment, server 220 may generate and send an indication to customer device 140 that the document received from customer device 140 and processed by server 220 is available for access (step 610). Customer device 140 may generate an interface that includes an option for the user to request to view one or more documents loaded by server 220. For example, when requested by a mobile application executing on customer device 140, server 220 may generate and send the content of the received document. Additionally or alternatively, server 220 may generate and send a message to customer device 140 to display the received document on a website associated with financial service provider 120. In one embodiment, server 220 may send an identifier of each document associated with the customer 130 that uploaded the documents.

In certain embodiments, server 220 may generate and send loan status information to customer device 140 reflecting the status of a loan application. For example, as shown in step 620, server 220 may be configured to generate and send customer 130 a message through customer device 140 indicating the current status of the loan application in connection with one or more conditions that had to be fulfilled (e.g., "Condition Fulfilled" or "Condition Pending"). Thus, as an example, server 220 may send a message indicating that a document request for a particular document type (e.g., W-2) was received, and that the corresponding condition has been fulfilled. In some embodiments, server 220 may update a web-enabled interface to notify customer 130 that the document has been successfully uploaded. For example, server 220 may generate graphics, text, etc. to indicate the document upload status, such as a graphical check mark next to the w-2 form shown on the web-enabled interface.

In some embodiments, server 220 may be configured to generate and send messages with loan affiliate 150 consistent with disclosed embodiments. For instance, in one aspect, server 220 may notify loan affiliate 150 of a mortgage condition associated with a loan application (e.g., step 630). In one aspect, server 220 may notify loan affiliate 150 that customer 130 has provided the requested document or that the unfulfilled condition is fulfilled. Additionally or alternatively, server 220 may send loan affiliate 150 the uploaded document.

Figure 7:
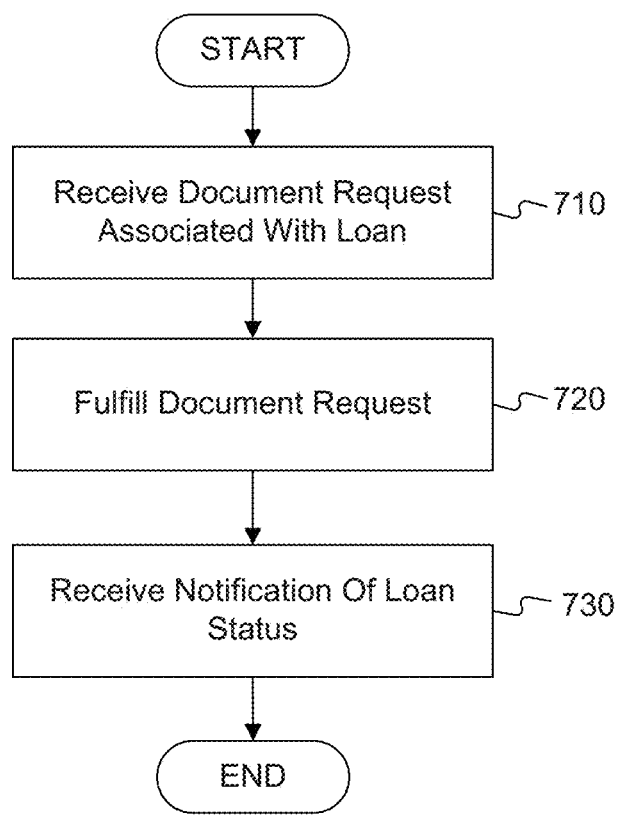
FIG. 7 depicts a flowchart of an exemplary loan application completion process consistent with disclosed embodiments.

In other embodiments, server 220 may request a document from loan affiliate 150 or another entity. For example, server 220 may request a document provided by loan affiliate 150 associated with the loan application of customer 130 (e.g. home inspection report). The document may fulfill a condition for the loan application. Server 220 may process a file associated with the document and notify loan affiliate 150 and/or customer 130 as described above, FIG. 7 is a flow diagram 700 of an exemplary loan processing process consistent with disclosed embodiments. In step 710, customer 130 (via customer device 140), loan affiliate 150, or another element or entity may receive from financial service provider 120 a document request associated with the loan. For example, customer 130 may receive the document request through customer device 140 as an email, text alert, mobile application alert, etc. Alternatively or additionally, customer 130 may view the document request on a web-enabled user interface (e.g. website) associated with financial service provider 120. As described above, the document request may be associated with an unfulfilled condition for the loan application, Customer 130 may choose to accept or ignore the document request.

If customer 130 accepts the document request, customer 130 may fulfill the document request by uploading the requested document (step 720). For example, customer 130 may use customer device 140 to record a picture of the requested document. Customer 130 may use customer device 140 to upload the requested document using the recorded picture, or by other means consistent with the disclosed embodiments.

The disclosed embodiments also provide notifications of loan application status (step 730). For example, server 220 may be configured to generate and send to customer device 140 a loan status message reflecting the status of a loan application associated with the requested documents (e.g., step 730). In one aspect, server 220 may generate and send to customer device 140 a notification message that a condition has been approved and fulfilled or that it is pending and requires further approval. The notification may be an email, SMS alert, or a mobile application alert. Additionally or alternatively, server 220 may generate and provide loan status information for access by customer 130 via a web-enabled interface.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

What is claimed is:

1. A method for processing electronic documents from a customer device, comprising:

reviewing, by one or more processors, a set of conditions associated with a loan application of a customer;

identifying, by the one or more processors, an unfulfilled condition associated with the loan application of a customer;

sending, by the one or more processors, a request for a loan application document based on the identified unfulfilled condition, the request causing a mobile application to display an alert message on an interface of the customer device, the alert message comprising a selectable list of documents comprising the requested loan application document, wherein selection of the requested loan application document from the selectable list causes a digital camera process at the customer device to capture, using the digital camera, an electronic version of the requested loan application document;

receiving, by the one or more processors, the electronic version of the requested loan application document;

storing, by the one or more processors, the received electronic version of the requested loan application document;

confirming, by the one or more processors, that the received electronic version of the requested loan application document corresponds to the requested loan application document by:

determining a document type of the requested loan application document, identifying a plurality of markers in the received electronic version of the requested loan application document, comparing the identified markers with a plurality of predetermined markers associated with the document type, determining whether the identified markers correspond to one or more of the plurality of predetermined markers, verifying that a number of identified corresponding markers meets or exceeds a threshold of the plurality of predetermined markers, and assigning a unique identifier to the stored electronic version of the requested loan application document; and sending, by the one or more processors, a loan application status to the mobile application when the electronic version of the requested loan application document is confirmed to correspond to the requested loan application document.

2. The method according to claim 1, wherein the plurality of markers comprise at least one of: one or more keywords, one or more keyword formats, one or more phrases, one or more locations of keywords or phrases, one or more icons, or one or more characters.

3. The method according to claim 1, wherein the loan application status further comprises confirmation that the requested loan application document was successfully submitted.

4. The method according to claim 3, wherein the loan application status further comprises confirmation that the loan application associated with the customer is approved.

5. The method according to claim 1, further comprising: providing, by the one or more processors, an application interface for uploading the electronic version.

6. The method according to claim 1, wherein the requested loan application document comprises at least of: one w-2 form, pay stub, bank statement, appraisal document, home inspection document, signed contract, disclosure form, or driver's license copy.

7. The method according to claim 1, further comprising: sending, by the one or more processors, the request for the loan application document and the received electronic version of the requested loan application document over a network.

8. The method according to claim 1, further comprising: providing, by the one or more processors, the received electronic version of the requested loan application document to the customer device; and requesting a confirmation from the customer that the provided electronic version of the requested loan application document is appropriate.

9. The method according to claim 1, further comprising: providing, by the one or more processors, the customer a link to the received electronic version of the requested loan application document.

10. The method according to claim 1, further comprising: sending, by the one or more processors, an indication to the customer device that the received electronic version of the requested loan application document is accessible to view;

receiving, by the one or more processors, a request to view the received electronic version of the requested loan application document; and providing, by the one or more processors, access to the received electronic version of the requested loan application document to the customer device over a network.

11. The method according to claim 1, further comprising: displaying, by the one or more processors, a list of documents, the list of documents including a status indicator for each document in the list of documents indicating whether a given document has been received.

12. The method according to claim 1, further comprising: determining, by the one or more processors, that the received electronic version of the requested loan application document fulfills the identified unfulfilled condition.

13. The method according to claim 12, further comprising: sending, by the one or more processors, an indication to a loan affiliate that the identified unfulfilled condition has been fulfilled.

14. The method according to claim 1, wherein the alert message comprises at least one of: an email message, a text message, or a mobile application alert that is configured to display on the customer device when received.

15. A method for processing electronic documents from a customer device, comprising:

reviewing, by one or more processors, a set of conditions associated with a loan application of a customer;

identifying, by the one or more processors, an unfulfilled condition associated with the loan application of a customer;

sending, by the one or more processors, a request for a loan application document based on the identified unfulfilled condition, the request causing a mobile application to display an alert message on an interface of the customer device, the alert message comprising a selectable list of documents comprising the requested loan application document, wherein selection of the requested loan application document from the selectable list causes a digital camera process at the customer device to capture, using the digital camera, an electronic version of the requested loan application document;

receiving, by the one or more processors, the electronic version of the requested loan application document;

storing, by the one or more processors, the received electronic version of the requested loan application document;

confirming, by the one or more processors, whether the received electronic version of the requested loan application document corresponds to the requested loan application document by:

determining a document type of the requested loan application document, identifying a plurality of markers in the received electronic version of the requested loan application document, comparing the identified markers with a plurality of predetermined markers associated with the document type, determining whether the identified markers correspond to one or more of the plurality of predetermined markers, determining whether a number of identified corresponding markers meets or exceeds a threshold of the plurality of predetermined markers, and assigning a unique identifier to the stored electronic version of the requested loan application document; and sending, by the one or more processors, a notification to the mobile application when the electronic version of the requested loan application document is not confirmed to correspond to the requested loan application document.

16. The method according to claim 15, further comprising:

determining, by the one or more processors, whether the electronic version of the requested loan application document is not confirmed based on at least one of: a file size or a file extension associated with the electronic version of the requested loan application document; and sending, by the one or more processors, an indication of the determination that the electronic version of the requested loan application document is not confirmed to the mobile application.

17. The method according to claim 15, further comprising:

determining, by the one or more processors, whether the electronic version of the requested loan application document is not confirmed based on a failure of the identified corresponding markers to meet or exceed the threshold of the predetermined markers; and sending, by the one or more processors, an indication of the determination that the electronic version of the requested loan application document is not confirmed to the mobile application.

18. The method according to claim 15, further comprising:

determining, by the one or more processors, whether the electronic version of the requested loan application document is not confirmed based an inability to identify markers in the received electronic version of the requested loan application document; and sending, by the one or more processors, an indication of the determination that the electronic version of the requested loan application document is not confirmed to the mobile application.

19. The method according to claim 15, wherein the operations further comprise:

requesting, by the one or more processors, a second electronic version of the requested loan application document;

receiving, by the one or more processors, the second electronic version of the requested loan application document;

storing, by the one or more processors, the second electronic version of the requested loan application document;

identifying, by the one or more processors, a plurality of markers in second electronic version of the requested loan application document;

comparing, by the one or more processors, the identified plurality of markers in the second electronic version of the requested loan application document with the plurality of predetermined markers;

determining, by the one or more processors, whether the identified plurality of markers in the second electronic version of the requested loan application document correspond to one or more of the plurality of predetermined markers;

verifying, by the one or more processors, that a number of identified corresponding plurality of markers in the second electronic version of the requested loan application document meets or exceeds the threshold of the plurality of predetermined markers;

assigning, by the one or more processors, a second unique identifier to the stored second electronic version of the requested loan application document; and sending, by the one or more processors, a loan application status to the mobile application when the second electronic version of the requested loan application document is confirmed to correspond to the requested loan application document.

20. The method according to claim 19, wherein the loan application status further comprises the assigned second unique identifier for the second electronic version of the requested loan application document.

* * * * *